(12) United States Patent
Mauritz et al.

(10) Patent No.: US 8,750,214 B2
(45) Date of Patent: Jun. 10, 2014

(54) METHOD AND BASE STATION FOR DETECTING A HARQ-ACK CODEWORD

(75) Inventors: Oskar Mauritz, Johanneshov (SE); Fredrik Huss, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 194 days.

(21) Appl. No.: 13/510,271

(22) PCT Filed: Nov. 12, 2010

(86) PCT No.: PCT/SE2010/051249
§ 371 (c)(1),
(2), (4) Date: May 16, 2012

(87) PCT Pub. No.: WO2011/062547
PCT Pub. Date: May 26, 2011

(65) Prior Publication Data
US 2012/0230218 A1    Sep. 13, 2012

(30) Foreign Application Priority Data
Nov. 18, 2009 (EP) .................................. 09176279

(51) Int. Cl.
*H04W 4/00* (2009.01)
(52) U.S. Cl.
USPC ............ 370/328; 370/206; 370/208; 370/332
(58) Field of Classification Search
None
See application file for complete search history.

(56) References Cited

U.S. PATENT DOCUMENTS

| 8,165,035 B2 * | 4/2012 | Che et al. ...................... 370/252 |
| 8,315,185 B2 * | 11/2012 | Chan .............................. 370/252 |
| 2006/0109810 A1 * | 5/2006 | Au et al. ........................ 370/328 |

FOREIGN PATENT DOCUMENTS

| EP | 1560357 A2 * | 8/2005 | ................ H04L 1/16 |
| WO | 2009098219 A2 | 8/2009 | |
| WO | WO 2009098219 A2 * | 8/2009 | .............. H04W 4/00 |

* cited by examiner

*Primary Examiner* — Anh-Vu Ly
*Assistant Examiner* — Hashim Bhatti
(74) *Attorney, Agent, or Firm* — Coats & Bennett, P.L.L.C.

(57) ABSTRACT

A method in a base station for detecting a HARQ-ACK codeword comprised in a signal received from a UE is provided. The base station knows HARQ-ACK codewords being possible to detect. The base station receives (401) a signal from the UE comprising a modulation symbol. The base station estimates (402) a SNR value for the received signal, and calculates (403) soft values for the modulation symbol. When the SNR value is lower than a predetermined threshold value and when the modulation symbol of the received signal comprises more than two bits per modulation symbol, the base station uses a first mode. The first mode comprises correlating (405) only the two first calculated soft values for the modulation symbol with the one or more known possible HARQ-ACK codewords. In other cases, i.e. when the first mode is not used, the base station uses a second mode. The second mode comprises correlating (408) all calculated soft values for the modulation symbol with the known possible HARQ-ACK codewords.

22 Claims, 4 Drawing Sheets

METHOD AND BASE STATION FOR DETECTING A HARQ-ACK CODEWORD

TECHNICAL FIELD

The present invention relates to a method and an arrangement in a base station. In particular, it relates to detecting a HARQ-ACK codeword comprised in a signal received from a user equipment.

BACKGROUND

In a typical cellular radio system, also referred to as a wireless communication system, user equipments, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile termination, which user equipments may be, for example, portable, pocket, hand-held, computer-included, or car-mounted mobile devices which communicate voice and/or data via a radio access network.

The radio access network covers a geographical area which is divided into cell areas, with each cell area being served by a base station, e.g., a Radio Base Station (RBS), which in some networks is referred to as "eNB", "NodeB" or "B node" and which in this document is referred to as a base station. A cell is a geographical area where radio coverage is provided by the radio base station equipment at a base station site. The base station communicates over the air interface operating on radio frequencies with the user equipments within range of the base station.

In some versions of the radio access network, several base stations are typically connected, e.g. by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. In the end of 2008 the first release, Release 8, of the 3GPP Long Term Evolution (LTE) standard was finalized and Release 9 is currently being specified. Evolved Universal Terrestrial Radio Access (E-UTRA) is the air interface that is used in the LTE.

In a packet-based communications system using Automatic Repeat Request (ARQ), received packets are required to be acknowledged by the receiver, i.e. a message shall be sent from the receiver to the transmitter telling whether the packet was received correctly or not.

In e.g. US2006109810, preamble miss detection in a communication system using ARQ processes is depicted. The communication system transmits data packets from a sender to a receiver using hybrid automatic repeat request processes. The sender redundantly encodes each packet, divides the packet into sub packets, and sends the sub packets to the receiver in a time-interlaced manner. When the receiver returns a positive acknowledgement of a sub packet using an acknowledgement channel, the sender terminates transmission of the sub packets. The sender interprets the signals on the acknowledgement channel using a metric resulting from correlation of the signals with positive and negative acknowledgement symbols. The sender interprets low correlation of the acknowledgement channel signal with both positive and negative acknowledgement symbols as a preamble miss, and terminates transmission of the subpackets. After termination, the packet may be rescheduled for transmission. Early termination of packet transmission after a preamble miss improves bandwidth utilization and decreases latency of the packet with the missed preamble.

In the physical layer of E-UTRA a certain type of ARQ known as Hybrid ARQ (HARQ) is implemented both in uplink and downlink. Uplink (UL) is the portion of a communications link used for the transmission of signals from a user equipment to a base station. Downlink (DL) is the portion of a communications link used for the transmission of signals from a base station to a user equipment. The acknowledgement message in E-UTRA is denoted HARQ-ACK. In the following only HARQ-ACK transmitted in uplink is considered.

HARQ-ACK may be transmitted by the user equipment in response to certain Physical Downlink Shared CHannel (PDSCH) transmissions and includes one or several acknowledgements, either positive (ACK) or negative (NACK) in response to transport blocks transmitted in the downlink, which HARQ-ACK is indicated by a downlink grant. HARQ-ACK may be transmitted on one of the physical channels Physical Uplink Control CHannel (PUCCH) or Physical Uplink Shared CHannel (PUSCH). When HARQ-ACK is transmitted in a subframe in which the user equipment is scheduled for transmission, the HARQ-ACK may be multiplexed with data and/or other control information and transmitted on PUSCH to the base station.

Different modulation schemes and coding may be used for transmitting subframes of data on PUSCH depending on signal quality and cell usage. Quadrature Phase Shift Keying (QPSK) is commonly used, but in good radio conditions 16 Quadrature Amplitude Modulation (16 QAM) and 64 QAM may be used which increases data throughput rates, wherein QPSK has 4 constellation points; 16 QAM has 16 constellation points; 64 QAM has 64 constellation points.

For Frequency Domain Duplex (FDD) and for Time Domain Duplex (TDD) ACK/NACK bundling of the HARQ-ACK information comprises one or two bits. ACK/NACK bundling is achieved by acknowledging several transport blocks with one acknowledgement per predefined set of transport blocks. If all the transport blocks in the set are received correctly, the acknowledgement is positive (ACK), otherwise it is negative (NACK). The encoding of HARQ-ACK transmitted on PUSCH is described in the following. Each positive acknowledgement (ACK) is encoded as a binary '1', and each negative acknowledgement (NACK) is encoded as a binary '0'. If HARQ-ACK comprises 1-bit of information, i.e., $[o_0^{ACK}]$, it is first encoded according to Table 1 where $Q_m$ is the number of bits per symbol, i.e. $Q_m=2$, 4, and 6 for QPSK, 16 QAM, and 64 QAM, respectively. If HARQ-ACK comprises 2-bits of information, i.e., $[o_0^{ACK} \ o_1^{ACK}]$, it is first encoded according to Table 2 where $o_2^{ACK}=(o_0^{ACK}+o_1^{ACK})$ mod 2.

TABLE 1

Encoding of 1-bit HARQ-ACK

| $Q_m$ | Encoded HARQ-ACK |
|---|---|
| 2 | $[O_0^{ACK}\ y]$ |
| 4 | $[O_0^{ACK}\ y\ x\ x]$ |
| 6 | $[O_0^{ACK}\ y\ x\ x\ x\ x]$ |

TABLE 2

Encoding of 2-bit HARQ-ACK

| $Q_m$ | Encoded HARQ-ACK |
|---|---|
| 2 | $[O_0^{ACK}\ O_1^{ACK}\ O_2^{ACK}\ O_0^{ACK}\ O_1^{ACK}\ O_2^{ACK}]$ |
| 4 | $[O_0^{ACK}\ O_1^{ACK}\ x\ x\ O_2^{ACK}\ O_0^{ACK}\ x\ x\ O_1^{ACK}\ O_2^{ACK}\ x\ x]$ |
| 6 | $[O_0^{ACK}\ O_1^{ACK}\ x\ x\ x\ x\ O_2^{ACK}\ O_0^{ACK}\ x\ x\ x\ x\ O_1^{ACK}\ O_2^{ACK}\ x\ x\ x\ x]$ |

Figure 1:
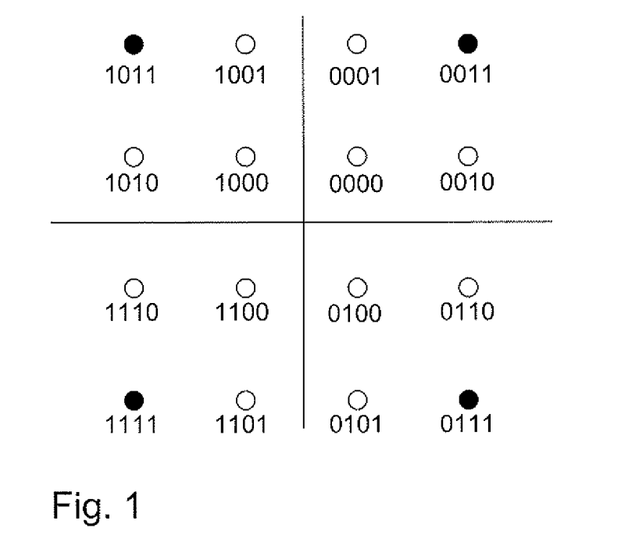
FIG. 1 is a schematic block diagram illustrating a constellation for 16 QAM according to prior art.

The "x" and "y" in Table 1 and 2 are placeholders for scrambling the HARQ-ACK bits in correlation with 3GPP TS 36.211, in a way that maximizes the Euclidean distance of the modulation symbols carrying HARQ-ACK information. In particular "x" will be transmitted as '1' after scrambling, i.e. the last $Q_m-2$ bits mapped on a modulation symbol are all '1's. As a result the HARQ-ACK is mapped only on the four corners of the constellation. The constellation for 16 QAM is shown in FIG. 1 where the mapping of the bits for HARQ-ACK is shown with filled circles.

The HARQ-ACK information is transmitted in $Q_{ACK}$ bits in Q' symbols, where $Q_{ACK}=Q'Q_m$, and the codeword $q_j^{ACK}$, j=0,1, . . . , $Q_{ACK}-1$ is obtained by concatenation of multiple encoded HARQ-ACK. $Q_{ACK}$ is the number of bits and Q' is the number of symbols.

The PUSCH transmission with HARQ-ACK differs from the PUSCH transmission without HARQ-ACK only in that in some modulation symbols the data or other control information is punctured and replaced by HARQ-ACK.

When the base station anticipates HARQ-ACK on PUSCH, the modulation symbols are demultiplexed and the HARQ-ACK modulation symbols are used by the HARQ-ACK detector. However, it might be that the user equipment transmits data and/or other control information on PUSCH in response to an uplink grant, but that the UE has not received the downlink grant for receiving a transmission from the base station. As a consequence the UE will not transmit HARQ-ACK but data or other control information in the modulation symbols intended for HARQ-ACK. To send nothing at all, data or other control information, in the modulation symbols intended for HARQ-ACK behaviour, is denoted DTX.

If the base station detects ACK instead of Discontinuous Transmission (DTX), so called ACK false detection, the base station will erroneously consider the corresponding downlink transport block as correctly received. Since the transport block has not been correctly received by the UE corresponding data will not be passed to the Medium Access Control (MAC) layer and from the MAC layer to the Radio Link Control (RLC) layer. Data will hence be missing in the RLC layer. This will cause ARQ retransmissions in the RLC layer which introduce delay and possibly large retransmissions and hence is undesirable. Also, if a NACK is detected erroneous that in reality is DTX, the base station will retransmit the packet in such a way that the user equipment will not be capable to decode it. It is thus a problem for the HARQ-ACK detector for PUSCH in the eNodeB, if it can not distinguish between data and HARQ-ACK and decode the correct HARQ-ACK message if present.

SUMMARY

It is therefore an object of the invention to provide a mechanism in a base station for an improved way of detecting an HARQ-ACK codeword comprised in a signal received from a user equipment.

According to a first aspect of the invention, the object is achieved by a method in a base station for detecting a HARQ-ACK codeword comprised in a signal received from a user equipment. The user equipment is arranged to communicate with the base station over a radio channel. The base station has knowledge of one or more HARQ-ACK codewords that are possible to detect in the received signal. The base station receives a signal from the user equipment over the radio channel. The signal comprises a modulation symbol. The base station estimates a SNR value for the received signal, which SNR value will be used to decide whether a first mode or a second mode shall be used for detecting a HARQ-ACK codeword in the received signal. The base station calculates soft values for the modulation symbol in the received signal. When the estimated SNR value is lower than or equal to a predetermined threshold value and when the modulation symbol of the received signal comprises more than two bits per modulation symbol, the base station uses the first mode for detecting a HARQ-ACK codeword in the received signal. The first mode comprises that the base station correlates only the two first soft values that was calculated for the modulation symbol in the received signal, with the one or more known possible HARQ-ACK codewords. In other cases, i.e. when the first mode is not used, the base station 110 uses the second mode for detecting a HARQ-ACK codeword in the received signal. The second mode comprises that the base station correlates all calculated soft values for the modulation symbol in the received signal with the one or more known possible HARQ-ACK codewords.

According to a second aspect of the invention, the object is achieved by a base station for detecting a HARQ-ACK codeword comprised in a signal received from a user equipment. The user equipment is arranged to communicate with the base station over a radio channel. The base station has knowledge of one or more HARQ-ACK codewords that are possible to detect in the received signal. The base station further comprises a receiver configured to receive a signal comprising a modulation symbol from the user equipment over the radio channel. The base station further comprises an estimating circuit configured to estimate an SNR value for the received signal which SNR value will be used to decide whether a first mode or a second mode shall be used for detecting a HARQ-ACK codeword in the received signal. The base station further comprises a calculating circuit configured to calculate soft values for the modulation symbol in the received signal. The base station comprises a first mode detector configured to be used in the first mode for detecting a HARQ-ACK codeword in the received signal. The first mode is used when the estimated SNR value is lower than or equal to a predetermined threshold value and when the modulation symbol of the received signal comprises more than two bits per modulation symbol. The first mode detector is configured to correlate only the two first calculated soft values for the modulation symbol in the received signal with the one or more known possible HARQ-ACK codewords. The base station further comprises a second mode detector configured to be used in the second mode for detecting a HARQ-ACK codeword in the received signal. The second mode is used in other cases. The second mode detector is configured to correlate all calculated soft values for the modulation symbol in the received signal with the one or more known possible HARQ-ACK codewords.

Since the base station comprises two modes for correlation, whereof one for the specific case of low SNR, correlating only the two first soft values that is calculated for the modulation symbol in the received signal, with the one or more known possible HARQ-ACK codewords, the bias towards low SNR is mitigated, which bias may have resulted in detecting erroneous HARQ-ACK codewords. This solution therefore provides an improved way of detecting an HARQ-ACK codeword comprised in a signal received from a user equipment in a base station.

An advantage with the present solution is that HARQ-ACK detection is performed reliably for both low SNR using the first mode, and for high SNR using the second mode, for both QPSK and higher order modulation.

BRIEF DESCRIPTION OF THE DRAWINGS

The invention is described in more detail with reference to attached drawings illustrating exemplary embodiments of the invention and in which.

DETAILED DESCRIPTION

Figure 2:
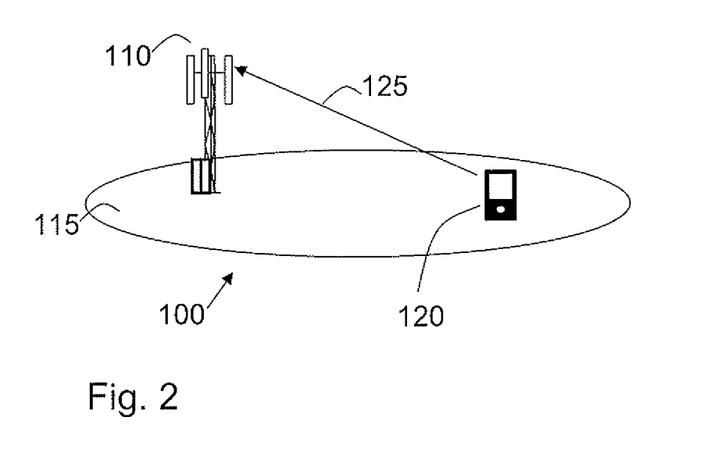
FIG. 2 is a schematic block diagram illustrating embodiments of a wireless communication network.

FIG. 2 depicts a wireless communications system 100 in which the present solution may be implemented. The wireless communications system 100 may be an LTE communications system, or any other wireless communications system using.

The wireless communications system 100 comprises a base station 110 serving a cell 115. The base station 110 is a radio base station such as an eNB, a Radio Base Station (RBS) or any other network unit capable to communicate over a radio carrier with user equipments being present in the cell 115.

A user equipment 120 being present within the cell 115, is served by the base station 110, and is therefore capable of communicating with the base station 110 using a radio channel 125 over an air interface between the base station 110 and the user equipment 120. The user equipment 120 may be a terminal, e.g. a mobile terminal or a wireless terminal, a mobile phone, a computer such as e.g. a laptop, a Personal Digital Assistants (PDA), or any other radio network unit capable to communicate with a base station over an air interface. The air interface may e.g. be an E-UTRA air interface used in LTE.

The wireless communications system 100 is a packet-based communications system in which the base station 110 and the user equipment 120 use HARQ over the air interface.

As part of the invention a problem will first be identified and discussed.

Soft Values

For decoding received bits, the base station 110 may map received modulated symbols onto bits for further processing in a decoder. To improve the decoder performance soft values for the bits are used. Soft values may be calculated in a soft demapper of the base station 110 from the received signal. The soft value for bit b, s(b), is typically defined to be the log-likelihood ratio, which is positive if it is more likely that b=0 than that b=1 and negative otherwise. The higher reliability of the bit, the higher is the absolute value of the soft value.

Figure 3:
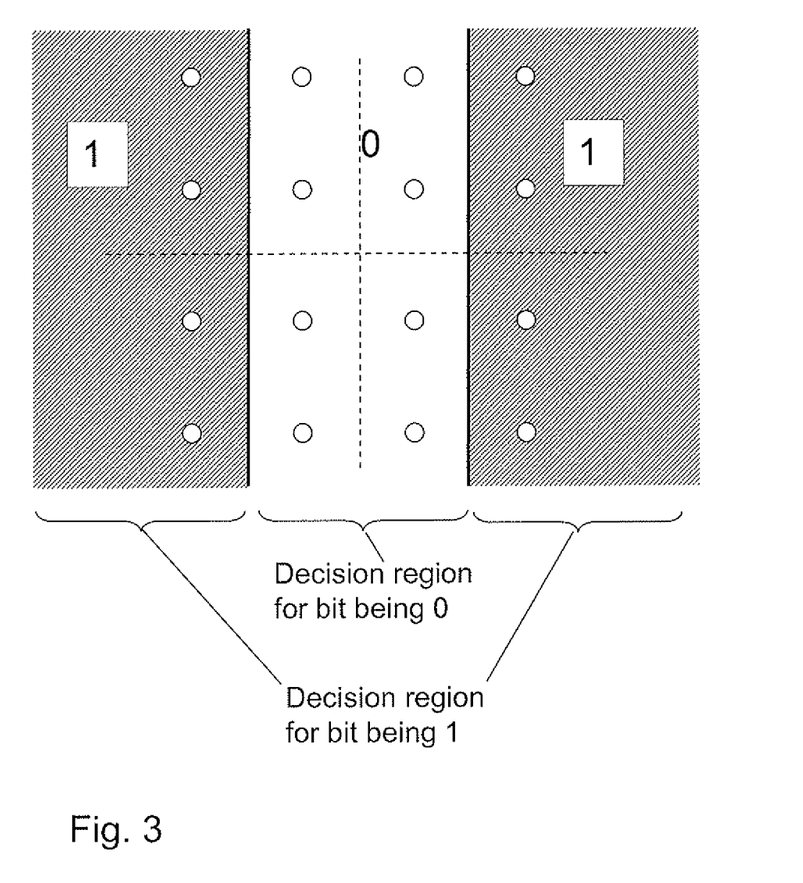
FIG. 3 is a schematic block diagram illustrating symbol mapping for the third bit in 16 QAM.

For QPSK the soft values are given by $$s_{2n} = x_n$$

$$s_{2n+1} = y_n \quad (1)$$

where $x_n$ and $y_n$ are scaled versions of the real and imaginary parts of the received complex symbol n. For higher-order modulation such as e.g. 16 QAM, and 64 QAM, the expressions for the soft values become more complicated and different approximations may be used. However, in general the symbol mapping in E-UTRA is such that for all bits except the two first bits, the decision regions are larger for the bit being 1 than for the bit being 0, see FIG. 3 for an example for the third bit in 16 QAM. At low Signal to Noise Ratio (SNR), the received symbols will spread in a region that is larger than the constellation and as a consequence the soft values will be biased towards negative values at low SNR, i.e. '1's will be more probable than '0's because of the larger decision regions for '1'.

A measure of the probability of a codeword of N bits may be obtained by mapping the bits according to $0 \rightarrow 1$ and $1 \rightarrow -1$. Let $\bar{q}$ denote the vector comprising the N bits in the codeword after the mapping. The soft values may also be arranged in a vector $\bar{s}$ and the correlation between $\bar{q}$ and $\bar{s}$ is defined by the scalar product $\bar{q} \cdot \bar{s}$. Then, the higher the correlation is, the higher is the probability that the codeword $\bar{q}$ was transmitted. In particular the most probable of all codewords has the highest correlation with the soft values.

In case of DTX, data, other control information or nothing at all will be transmitted instead of a HARQ-ACK codeword and the correlation with HARQ-ACK codewords will in most cases be low.

A straightforward solution for the HARQ-ACK detector is to correlate the soft values with all possible HARQ-ACK codewords and detect the codeword with the highest correlation unless the correlation is lower than a predetermined threshold, in which case DTX is detected. To handle the bias at low SNR for all soft values except for the two first soft values for every modulation symbol the base station 110 according to the present solution comprises two modes, one mode for low SNR and one mode for high SNR. First, the SNR is estimated in some way. The first mode is then used for low SNR, implying that the detector only correlates the two first soft values per modulation symbol with the corresponding elements of the HARQ-ACK codewords. The second mode is used for high SNR, implying that the detector correlates all soft values for HARQ-ACK with the HARQ-ACK codewords.

Figure 4:
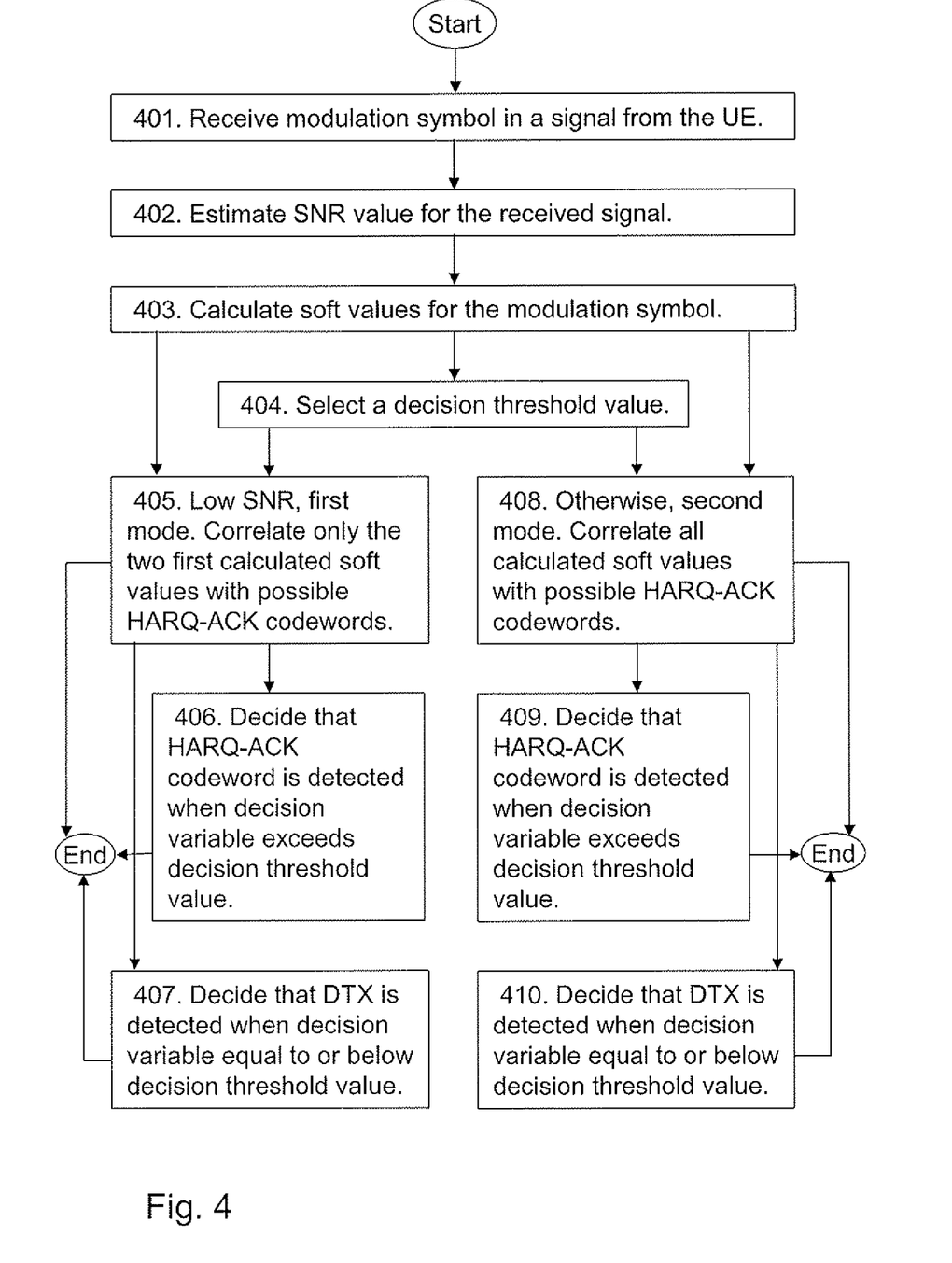
FIG. 4 is a flowchart depicting embodiments of a method.

The present solution relating to a method in the base station 110 for detecting a HARQ-ACK codeword comprised in a signal received from a user equipment 120, according to some embodiments will now be described with reference to the flowchart depicted in FIG. 4. As mentioned above, the user equipment 120 is arranged to communicate with the base station 110 over a radio channel 125.

The base station 110 operates in two modes, a first mode and a second mode. E.g. it may be a HARQ-ACK detector within the base station 110 that comprises the two modes and performs the detection, which may be referred to as a first mode detector and a second mode detector which will further described below. The first mode is intended for low SNR, and the second mode is intended for high SNR.

By way of introduction, the base station 110 has transmitted a packet to the user equipment 120. The base station 110 is waiting for a message from the receiving user equipment 120 telling whether the packet was received correctly or not. The base station 110 has knowledge of one or more HARQ-ACK codewords that is possible to detect in the received signal. Each of these one or more known HARQ-ACK codewords may relate to acknowledgement or negative acknowledgement of a respective transmitted packet. Each codeword may either relate to a single ACK/NACK bit or to a combination of two ACK/NACK bits. The method comprises the following steps which steps may be taken in any suitable order.

Step 401

The base station 110 receives a signal from the user equipment 120 over the radio channel 125. The signal comprises a modulation symbol. Note that one or more than one modulation symbol may be comprised in the signal. The modulation symbol transmitted by the user equipment 120, may comprise a HARQ-ACK codeword such as an acknowledgement or a negative acknowledgement confirming whether the packet transmitted by the base station 110 has been correctly received or not. The modulation symbol may alternatively comprise user data, other control information or nothing at all i.e. so called DTX, instead of a HARQ-ACK codeword.

Step 402

As a basis for deciding which mode to use, the base station 110 further estimates an SNR value for the received signal, which SNR value will be used to decide whether a first mode or a second mode shall be used for detecting a HARQ-ACK codeword in the received signal. The SNR may be estimated in a number of ways, either from an explicit SNR estimator or from the magnitude of the calculated soft values. High absolute values of the soft values correspond to high SNR. Other alternatives are for example to estimate the SNR from the selected modulation and coding scheme of the received signal, or to estimate the SNR from earlier signal and noise measurements.

Step 403

As mentioned in step 401, the received signal may comprise a HARQ-ACK codeword, which HARQ-ACK codeword the base station 110 will try to detect. For decoding received bits, the base station 110 may map received modulated symbols onto bits for further processing in e.g. a decoder or a detector. To improve the decoder performance, soft values for the bits are used as mentioned above. In this step, the base station 110 calculates a soft values for the modulation symbol or symbols in the received signal. This may be performed as described above under "soft values". The modulation symbol may e.g. be QPSK, 16 QAM, or 64 QAM comprising 2, 4, or 6 bits per modulation symbol, respectively. This means that the number of soft values for each modulation symbol of QPSK, 16 QAM, or 64 QAM is respective 2, 4, or 6.

Step 404

This step is an optional step. The base station 110 selects a decision threshold value $\tau$. $\tau$ will be used for deciding whether a HARQ-ACK codeword is detected in the received signal.

In some embodiments relating to the first mode, this step comprises selecting the decision threshold value $\tau$ such that it is proportional to the norm of $\tilde{s}$ so that the ratio $\mu_i/\tau$ is independent of the amplitude of the soft values. The norm of $\tilde{s}$ may e.g. be an $l_p$-norm where p is a positive integer, for example an $l_2$-norm. $\tilde{s}$ and $\mu_i$ will be described below.

In some embodiments relating to the second mode, this step comprises selecting the decision threshold value $\tau$ such that it is proportional to the norm of $\bar{s}$ so that the ratio $\lambda_i/\tau$ is independent of the amplitude of the soft values. The norm of $\bar{s}$ may be an $l_p$-norm where p is a positive integer, for example an $l_1$-norm. $\bar{s}$ and $\lambda_i$ will be described below.

Step 405

This step relates to the first mode. When the estimated SNR value is lower than a predetermined threshold value and when the modulation symbol of the received signal comprises more than two bits per modulation symbol such as e.g. 16 QAM or 64 QAM, the base station 110 uses the first mode for detecting a HARQ-ACK codeword in the received signal. The first mode comprises that the base station 110 correlates only the two first soft values for the modulation symbol in the received signal with the one or more known possible HARQ-ACK codewords. I.e. if the modulation symbol is of 16 QAM, four soft values were calculated and in this case only the two first of the four soft values are used for the correlation. This is since the bias for all soft values except for the two first soft values for every modulation symbol appears at low SNR, i.e. when the estimated SNR value is lower than a predetermined threshold value. Low SNR is typically SNR lower than a threshold value between 5 and 15 dB. The predetermined threshold value may therefore for example be selected between 5 and 15 dB.

In some embodiments this step comprises calculating a decision variable $\mu_i$ for the first mode, the decision variable $\mu_i$ being the correlation of the vector $\tilde{q}^i$ and the vector of said two first calculated soft values $\tilde{s}$ corresponding to the bits where HARQ-ACK should be transmitted in the received signal, for every possible transmitted HARQ-ACK codeword $\tilde{q}^i$ according to $$\mu_i = \tilde{q}^i \cdot \tilde{s} = \sum_{n=0}^{2Q'-1} q'^i_n s'_n,$$

wherein Q' is the number of symbols, $\tilde{s}$ denotes the vector of the soft values $s'_n$, n=0,1, ..., 2Q'–1, $q'^i_n$ is the nth element of the vector $\tilde{q}^i$, and where i is the index of the possible transmitted HARQ-ACK codeword. (See definition of $\tilde{q}^i$ below.)

Step 406

This step is an optional step relating to the first mode. In some embodiments the base station 110 decides that the HARQ-ACK codeword $\bar{q}^m$ is detected in the received signal when the decision variable $\mu_m$ for $\bar{q}^m$ exceeds the decision threshold value $\tau$. $\bar{q}^m$ is the most probable codeword obtained as the codeword with the maximum decision variable $\mu_m$ among all decision variables.

Step 407

This step is also an optional step relating to the first mode. The base station 110 decides that the received signal is considered to comprise DTX, when the decision variable $\mu_m$ for $\bar{q}^m$ is equal to or below the threshold value $\tau$. $\bar{q}^m$ is the most probable codeword obtained as the codeword with the maximum decision variable $\mu_m$ among all decision variables.

Step 408

This step, relating to the second mode, handles the cases when the SNR is high. i.e. when the estimated SNR value exceeds the predetermined threshold value, the base station 110 uses the second mode for detecting a HARQ-ACK codeword in the received signal. The second mode comprises that the base station 110 correlates all calculated soft values for the modulation symbol in the received signal with the one or more known possible HARQ-ACK codewords. The predetermined threshold value may be selected between 5 and 15 dB SNR, preferably between 7 and 12 dB SNR, such as for example 10 dB.

In some embodiments this step comprises calculating a decision variable $\lambda_i$ for the second mode, being the correlation of the codeword $\bar{q}^i$ and the vector of soft values $\bar{s}$ corresponding to the bits where HARQ-ACK should be transmitted in the received signal, for every possible HARQ-ACK codeword $\bar{q}^i$ according to $$\lambda_i = \bar{q}^i \cdot \bar{s} = \sum_{n=0}^{Q_{ACK}-1} q_n^j s_n,$$

wherein $\bar{s}$ denotes the vector of the soft values $s_n$, $n=0, 1 \ldots Q_{ACK}-1$, $Q_{ACK}$ is the number of bits, and $q_n^i$ denotes the nth element of the vector $\bar{q}^i$ and where i is the index of the possible transmitted HARQ-ACK codeword.

Step 409

This step is an optional step relating to the second mode. In some embodiments the base station 110 decides that a HARQ-ACK codeword $\bar{q}^m$ is detected in the received signal when the decision variable $\lambda_m$ for $\bar{q}^m$ exceeds the decision threshold value $\tau$. $\bar{q}^m$ is the most probable codeword with the maximum decision variable $\lambda_m$ among all decision variables.

Step 410

This step is also an optional step relating to the second mode. in some embodiments the base station 110 decides that the received signal is considered to comprise DTX, when the decision variable $\lambda_m$ for $\bar{q}^m$ is equal to or below the threshold value $\tau$. $\bar{q}^m$ is the most probable codeword with the maximum decision variable $\lambda_m$ among all decision variables.

The first and second mode will now be described more in detail.

Second Mode

To better explain, the second mode will be described first. For high SNR, all received soft values will be unbiased, and the second mode is used. Therefore a decision variable $\lambda_i$ for the second mode, being the correlation of the codeword $\bar{q}^i$ and the vector of soft values $\bar{s}$ corresponding to the bits where HARQ-ACK should be transmitted is calculated for every possible transmitted HARQ-ACK codeword $\bar{q}^i$ according to.

$$\lambda_i = \bar{q}^i \cdot \bar{s} = \sum_{n=0}^{Q_{ACK}-1} q_n^j s_n \qquad (2)$$

wherein $Q_{ACK}$ is the number of bits, and where i is the index of the possible transmitted HARQ-ACK codeword and $q_n^i$ is the n th bit after mapping 0→1 and 1→−1 of the i th HARQ-ACK codeword.

A decision threshold value $\tau$ is used for deciding whether a HARQ-ACK codeword is detected in the received signal or not, i.e. to distinguish valid HARQ-ACK and DTX. The decision threshold value $\tau$ may be selected to be proportional to the norm of $\bar{s}$ so that the ratio $\lambda_i/\tau$ is independent of the amplitude of the soft values. Such a norm may be a $l_p$-norm where p is a positive integer. The $l_p$-norm $\|\bar{v}\|_p$ of a vector $\bar{v}=(v_0, v_1, \ldots, v_{N-1})$ is defined as $$\|\bar{v}\|_p = \left(\sum_{n=0}^{N-1} |v_n|^p\right)^{1/p},$$

where $|v_n|$ is the absolute value of $v_n$. One way is to select the decision threshold value $\tau$ so that it is proportional to the $l_1$-norm of $\bar{s}$, i.e. $\|\bar{s}\|_1 = \sum_{n=0}^{Q_{ACK}-1} |s_n|,$ where $|s_n|$ denotes the absolute values of $s_n$:

$$\tau = T_2 \|\bar{s}\|_1 \qquad (3)$$

where $T_2$ is a parameter selected to obtain desired probability of ACK false detection. The higher value of $T_2$, the lower is the probability of ACK false detection, but the higher is the probability of ACK missed detection, i.e. the probability that ACK is detected as DTX. $T_2$ may depend on the modulation scheme and on Q'.

The most probable codeword $\bar{q}^m$ is obtained as the codeword with the maximum decision variable $\lambda_m$ among all decision variables. The decision Γ, which HARQ-ACK codeword or none, i.e. DTX, that is comprised in the received signal may then be calculated as:

$$\Gamma = \begin{cases} \bar{q}^m & \text{if } \lambda_m > \tau \\ DTX, & \text{otherwise} \end{cases} \qquad (4)$$

This means that if $\lambda_m$ exceeds the decision threshold value $\tau$, the most probable HARQ-ACK codeword $\bar{q}^m$ is detected in the received signal. Otherwise, i.e. if $\lambda_m$ is equal to or below the decision threshold value $\tau$, the received signal is considered to comprise DTX, i.e. the received signal comprises data, other control information, or nothing at all.

First Mode

The first mode will be used at low SNR, where all received soft values but the two first for every modulation symbol will be biased and will tend to have the same negative sign as the HARQ-ACK codewords after mapping on 1 and −1, i.e. by mapping the bits according to 0→1 and 1→−1. Hence, if the threshold in (3) used in the second mode, would be used in the first mode, the probability of a DTX erroneously being detected as a valid codeword increases for low SNR.

Therefore, for low SNR the first mode is used which implies that only the two first soft values of every modulation symbol are considered. Let $\tilde{q}^i$ denote the vector, with elements formed by the two first bits in every modulation symbol of the codeword $\bar{q}^i$, and let $\tilde{s}$ denote the vector of the corresponding soft values $s'_n$, $n=0,1, \ldots, 2Q'-1$.

This means that the step wherein the base station 110 correlates only the two first calculated soft values for the modulation symbol in the received signal with the one or more known possible HARQ-ACK codewords may be performed as follows:

The step of correlating may comprise that a decision variable $\mu_i$ for the second mode, being the correlation of the vector $\tilde{q}^i$ and the vector of soft values $\tilde{s}$ corresponding to the bits where HARQ-ACK should be transmitted, is calculated using the two first soft values only for each modulation symbol according to:

$$\mu_i = \tilde{q}^i \cdot \tilde{s} = \sum_{n=0}^{2Q'-1} q_n'^i s_n' \quad (5)$$

where i is the index of the possible transmitted HARQ-ACK codeword and $q'^i_n$ is the n th bit after mapping 0→1 and 1→−1 of the i th HARQ-ACK codeword counting only the two first bits for each modulation symbol.

Also in the first mode, a decision threshold value τ may be used for deciding whether a HARQ-ACK codeword is detected in the received signal or not, i.e. to distinguish valid HARQ-ACK and DTX.

The decision threshold value τ may be selected to be proportional to the norm of $\tilde{s}$ so that the ratio $\mu_i/\tau$ is independent of the amplitude of the soft values. Such a norm may be an $l_p$-norm where p is a positive integer.

A suitable decision threshold value τ may be proportional to the $l_2$-norm, also known as the Euclidean norm.

$$\|\tilde{s}\|_2 = \sqrt{\sum_{n=0}^{2Q'-1} s_n'^2} = \sqrt{\sum_{n=0}^{Q'-1} x_n^2 + y_n^2} \quad (6)$$

$$\tau = T_1 \|\tilde{s}\|_2$$

where $T_1$ is a parameter selected to obtain desired probability of ACK false detection. The higher value of $T_1$, the lower is the probability of ACK false detection, but the higher is the probability of ACK missed detection, i.e. the probability that ACK is detected as DTX. $T_1$ may depend on the modulation scheme and on Q'.

The most probable codeword $\bar{q}^m$ is obtained as the codeword with the maximum decision variable $\mu_m$ among all decision variables. The decision Γ, which HARQ-ACK codeword or none, i.e. DTX, that is comprised in the received signal may then be calculated as:

$$\Gamma = \begin{cases} \bar{q}^m & \text{if } \mu_m > \tau \\ DTX, & \text{otherwise} \end{cases} \quad (7)$$

This means that if $\mu_m$ exceeds the decision threshold value τ, the most probable HARQ-ACK codeword $\bar{q}^m$ is detected in the received signal. Otherwise, i.e. when $\mu_m$ is equal to or below the decision threshold value τ, the received signal is considered to comprise DTX, i.e. the received signal comprises data, other control information, or nothing at all.

Using the $l_2$-norm for the decision threshold value is beneficial since to maximize the absolute value of the ratio $\mu_i/\|\tilde{s}\|_2$ the received soft values should not only have the correct sign but also be of equal amplitude, which on average is true for the HARQ-ACK information since it is mapped on modulation symbols with equal amplitude of both the real and imaginary parts.

Hence HARQ-ACK information has higher absolute value of the ratio between the decision variables and the decision threshold value than most instances of data, which increases the probability of making a correct detection of DTX.

Figure 5:
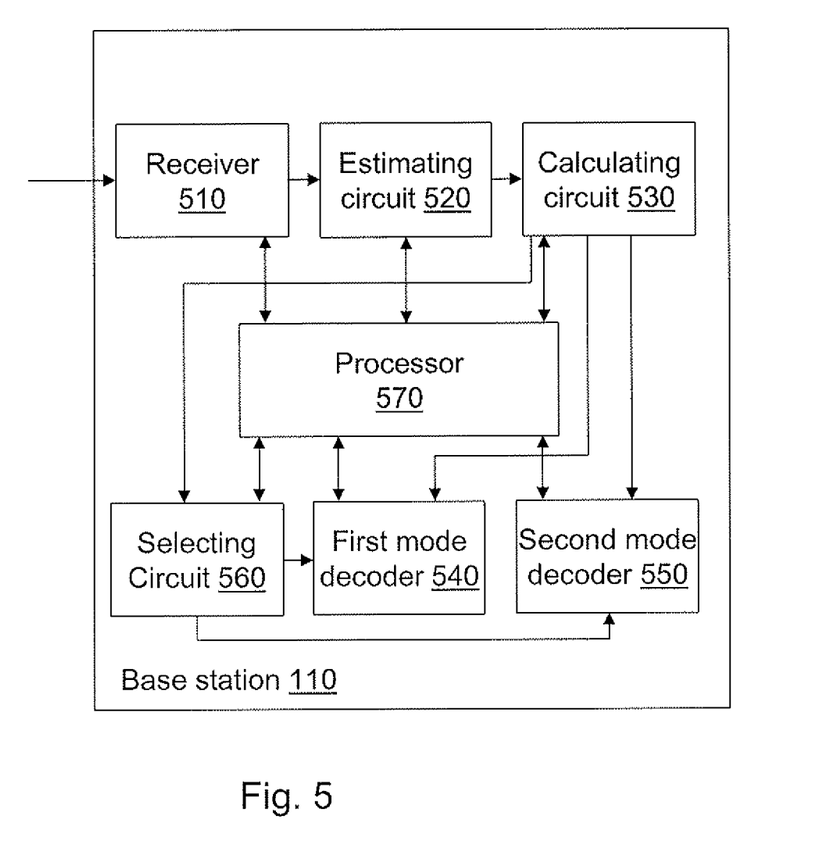
FIG. 5 is a schematic block diagram illustrating embodiments of a base station.

To perform the method steps above for detecting a HARQ-ACK codeword comprised in a signal received from the user equipment 120, the base station 110 comprises an arrangement depicted in FIG. 5. As mentioned above, the user equipment 120 is arranged to communicate with the base station 110 over a radio channel 125. The base station 110 has knowledge of one or more HARQ-ACK codewords that are possible to detect in the received signal. The base station 110 comprises the first mode and the second mode.

The base station 110 comprises a receiver 510 configured to receive a signal from the user equipment 120 over the radio channel, which signal comprises a modulation symbol.

The base station 110 further comprises an estimating circuit 520 configured to estimate an SNR value for the received signal, which SNR value will be used to decide whether a first mode or a second mode shall be used for detecting a HARQ-ACK codeword in the received signal. The estimation circuit 520 may e.g. be a so called SNR estimator.

The base station 110 further comprises a calculating circuit 530 configured to calculate soft values for the modulation symbol in the received signal. The calculation circuit 530 may e.g. be a so called soft demapper.

The base station 110 further comprises a first mode detector 540 configured to be used in the first mode for detecting a HARQ-ACK codeword in the received signal, when the estimated SNR value is lower than or equal to a predetermined threshold value and when the modulation symbol of the received signal comprises more than two bits per modulation symbol.

The first mode detector 540 is configured to correlate only the two first calculated soft values for the modulation symbol in the received signal with the one or more known possible HARQ-ACK codewords.

In some embodiments the first mode detector 540 is configured to correlate such that the correlation further comprises to calculate a decision variable $\mu_i$ for the first mode. The decision variable $\mu_i$ is the correlation of the vector $\tilde{q}^i$ and the vector of said two first calculated soft values $\tilde{s}$ corresponding to the bits where HARQ-ACK should be transmitted in the received signal This calculation is performed for every possible transmitted HARQ-ACK codeword $\tilde{q}^i$, according to $$\mu_i = \tilde{q}^i \cdot \tilde{s} = \sum_{n=0}^{2Q'-1} q_n'^i s_n'$$

wherein Q' is the number of symbols, $\tilde{s}$ denotes the vector of the soft values $s'_n$, n=0,1, ..., 2Q'−1, $q'^i_n$ is the nth element of the vector $\tilde{q}^i$, and where i is the index of the possible transmitted HARQ-ACK codeword.

In some embodiments, $\bar{q}^m$ is the most probable codeword obtained as the codeword with the maximum decision variable $\mu_m$ among all decision variables. In these embodiments the first mode detector 540 is further configured to decide that the HARQ-ACK codeword $\bar{q}^m$ is detected in the received signal when the decision variable $\mu_m$ for $\bar{q}^m$ exceeds the decision threshold value τ. In these embodiments the first mode detector 540 is also configured to decide that the received signal is considered to comprise DTX, when the decision variable $\mu_m$ for $\bar{q}^m$ is equal to or below the threshold value τ.

The base station 110 further comprises a second mode detector 550 configured to be used in the second mode for detecting a HARQ-ACK codeword in the received signal otherwise, i.e. in the cases when the first mode is not used. The second mode detector 550 is configured to correlate all calculated soft values for the modulation symbol in the received signal with the one or more known possible HARQ-ACK codewords.

In some embodiments, the second mode detector 550 is configured to correlate such that the correlation further comprises to calculate a decision variable $\lambda_i$ for the second mode.

The decision variable $\lambda_i$ is the correlation of the vector $\bar{q}^i$ and the vector of soft values $\bar{s}$ corresponding to the bits where HARQ-ACK should be transmitted in the received signal. This calculation is performed for every possible transmitted HARQ-ACK codeword $\bar{q}^i$, according to $$\lambda_i = \bar{q}^i \cdot \bar{s} = \sum_{n=0}^{Q_{ACK}-1} q_n^i s_n,$$

wherein $\bar{s}$ denotes the vector of the soft values $s_n$, $n=0, 1 \ldots Q_{ACK}-1$, and $Q_{ACK}$ is the number of bits, $q_n^i$ denotes the nth element of the vector $\bar{q}^i$, and where i is the index of the possible transmitted HARQ-ACK codeword.

In some embodiments $\bar{q}^m$ is the most probable codeword with the maximum decision variable $\lambda_m$ among all decision variables. In these embodiments the second mode detector 550 further is configured to decide that a HARQ-ACK codeword $\bar{q}^m$ is detected in the received signal when the decision variable $\lambda_m$ for $\bar{q}^m$ exceeds the decision threshold value $\tau$. In these embodiments the second mode detector 550 is also configured to decide that the received signal is considered to comprise DTX, when the decision variable $\lambda_m$ for $\bar{q}^m$ is equal to or below the decision threshold value $\tau$.

The base station 110 may further comprise a selecting circuit 560 configured to select a decision threshold value $\tau$.

In some embodiments the selecting circuit 560 is further configured to select the decision threshold value $\tau$ when the first mode is used, such that it is proportional to the norm of $\tilde{s}$ so that the ratio $\mu_i/\tau$ is independent of the amplitude of the soft values. In these embodiments, the norm of $\tilde{s}$ may be an $l_p$-norm where p is a positive integer. For example an $l_2$-norm is suitable for the first mode as mentioned above.

In some embodiments the selecting circuit 560, further is configured to select the decision threshold value $\tau$ when the second mode is used such that it is proportional to the norm of $\bar{s}$ so that the ratio $\lambda_i/\tau$ is independent of the amplitude of the soft values. In these embodiments, the norm of $\bar{s}$ is an $l_p$-norm where p is a positive integer. For example an $l_1$-norm is suitable for the second mode as mentioned above.

The present mechanism for detecting a HARQ-ACK codeword comprised in a signal received from the user equipment 120 may be implemented through one or more processors, such as a processor 570 in the base station 110 depicted in FIG. 5, together with computer program code for performing the functions of the present solution. The program code mentioned above may also be provided as a computer program product, for instance in the form of a data carrier carrying computer program code for performing the present solution when being loaded into the base station 110. One such carrier may be in the form of a CD ROM disc. It is however feasible with other data carriers such as a memory stick. The computer program code may furthermore be provided as pure program code on a server and downloaded to the base station 110.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appended claims.

The invention claimed is:

1. A method in a base station for detecting a Hybrid Automatic Repeat Request-ACKnowledgement (HARQ-ACK) codeword comprised in a signal received from a user equipment, which user equipment is arranged to communicate with the base station over a radio channel, which base station has knowledge of one or more HARQ-ACK codewords that are possible to detect in the received signal, the method comprising:
   receiving a signal from the user equipment over the radio channel, which signal comprises a modulation symbol,
   estimating a Signal to Noise Ratio (SNR) value for the received signal, which SNR value will be used to decide whether a first mode or a second mode shall be used for detecting the HARQ-ACK codeword in the received signal, calculating soft values for the modulation symbol in the received signal, when the estimated SNR value is lower than or equal to a predetermined threshold value and when the modulation symbol of the received signal comprises more than two bits per modulation symbol, using the first mode for detecting the HARQ-ACK codeword in the received signal, which first mode comprises correlating a subset of the soft values for the modulation symbol in the received signal with the one or more known possible HARQ-ACK codewords, and
   otherwise, using the second mode for detecting the HARQ-ACK codeword in the received signal, which second mode comprises correlating a set of the soft values for the modulation symbol in the received signal with the one or more known possible HARQ-ACK codewords.

2. The method according to claim 1, further comprising selecting a decision threshold value $\tau$.

3. The method according to claim 2, wherein correlating in the first mode comprises calculating a decision variable $\mu_i$ for the first mode, the decision variable $\mu_i$ being the correlation of a vector $\tilde{q}^i$ and a vector of two first calculated soft values $\tilde{s}$ corresponding to the bits where HARQ-ACK should be transmitted in the received signal, for every possible transmitted HARQ-ACK codeword $\tilde{q}^i$, according to $$\mu_i = \tilde{q}^i \cdot \tilde{s} = \sum_{n=0}^{2Q'-1} q'^i_n s'_n$$

wherein is the Q' is the number of symbols, $\tilde{s}$ denotes a vector of the soft values $s'_n$, $n=0,1,\ldots, 2Q'-1$, $q'^i_n$ is the nth element of the vector $\tilde{q}^i$, and where i is the index of the possible transmitted HARQ-ACK codeword.

4. The method according to claim 3, wherein $\bar{q}^m$ is the most probable codeword obtained as the codeword with the maximum decision variable $\mu_m$ among the decision variables, and wherein the first mode further comprises one of:
   deciding that the HARQ-ACK codeword $\bar{q}^m$ is detected in the received signal, when the decision variable $\mu_m$ for $\bar{q}^m$ exceeds the decision threshold value $\tau$, and
   deciding that the received signal is considered to comprise Discontinuous Transmission "DTX", when the decision variable $\mu_m$ for $\bar{q}^m$ is equal to or below the decision threshold value $\tau$.

5. The method according to claim 3, wherein selecting the decision threshold value $\tau$ in the first mode comprises selecting the decision threshold value $\tau$ such that it is proportional to the norm of $\tilde{s}$ so that the ratio $\mu_i/\tau$ is independent of the amplitude of the soft values.

6. The method according to claim 5, wherein the norm of $\tilde{s}$ is an $l_p$-norm where p is a positive integer.

7. The method according to claim 2, wherein correlating in the second mode comprises calculating a decision variable $\lambda_i$ for the second mode, being the correlation of a vector $\bar{q}^i$ and a vector of soft values $\bar{s}$ corresponding to the bits where HARQ-ACK should be transmitted in the received signal, for every possible transmitted HARQ-ACK codeword $\bar{q}^i$, according to $$\lambda_i = \bar{q}^i \cdot \bar{s} = \sum_{n=0}^{Q_{ACK}-1} q_n^i s_n,$$

wherein $\bar{s}$ denotes a vector of the soft values $s_n$, n=0, 1 . . . $Q_{ACK}-1$, and $Q_{ACK}$ is the number of bits, $q_n^i$ denotes the nth element of the vector $\bar{q}^i$, and where i is the index of the possible transmitted HARQ-ACK codeword.

8. The method according to claim 7, wherein $\bar{q}^m$ is the most probable codeword with the maximum decision variable $\lambda_m$ among all decision variables, and wherein the second mode further comprises one of:
  deciding that a HARQ-ACK codeword $\bar{q}^m$ is detected in the received signal when the decision variable $\lambda_m$ for $\bar{q}^m$ exceeds the decision threshold value $\tau$, and
  deciding that the received signal is considered to comprise DTX, when the decision variable $\lambda_m$ for $\bar{q}^m$ is equal to or below the decision threshold value $\tau$.

9. The method according to claim 7, wherein selecting a decision threshold value $\tau$ in the second mode comprises selecting the decision threshold value $\tau$ such that it is proportional to the norm of $\bar{s}$ so that the ratio $\lambda_i/\tau$ is independent of the amplitude of the soft values.

10. The method according to claim 9, wherein the norm of $\bar{s}$ is an $l_p$-norm where p is a positive integer.

11. The method according to claim 1, wherein the first mode comprises correlating only the two first soft values for the modulation symbol in the received signal with the one or more known possible HARQ-ACK codewords, and the second mode comprises correlating all calculated soft values for the modulation symbol in the received signal with the one or more known possible HARQ-ACK codewords.

12. A base station for detecting a Hybrid Automatic Repeat Request-ACKnowledgement (HARQ-ACK) codeword comprised in a signal received from a user equipment, which user equipment is arranged to communicate with the base station over a radio channel, which base station has knowledge of one or more HARQ-ACK codewords that are possible to detect in the received signal, the base station comprising:
  a receiver configured to receive a signal from the user equipment over the radio channel, which signal comprises a modulation symbol, an estimating circuit configured to estimate a Signal to Noise (SNR) value for the received signal, which SNR value will be used to decide whether a first mode or a second mode shall be used for detecting the HARQ-ACK codeword in the received signal, a calculating circuit configured to calculate soft values for the modulation symbol in the received signal, a first mode detector configured to be used in the first mode for detecting the HARQ-ACK codeword in the received signal, which first mode is used when the estimated SNR value is lower than or equal to a predetermined threshold value and when the modulation symbol of the received signal comprises more than two bits per modulation symbol, which first mode detector is configured to correlate a subset of the soft values for the modulation symbol in the received signal with the one or more known possible HARQ-ACK codewords, and a second mode detector configured to be used in the second mode for detecting the HARQ-ACK codeword in the received signal, which second mode is used otherwise, which second mode detector is configured to correlate a set of the calculated soft values for the modulation symbol in the received signal with the one or more known possible HARQ-ACK codewords.

13. The base station according to claim 12, further comprising a selecting circuit configured to select a decision threshold value $\tau$.

14. The base station according to claim 13, wherein the first mode detector is configured to, for every possible transmitted HARQ-ACK codeword $\tilde{q}^i$, correlate the codeword $\tilde{q}^i$ with a vector of two first calculated soft values $\tilde{s}$ corresponding to the bits in the received signal, where the HARQ-ACK codeword should be transmitted to calculate a decision variable $\mu_i$ for the first mode, according to $$\mu_i = \tilde{q}^i \cdot \tilde{s} = \sum_{n=0}^{2Q'-1} q'^i_n s'_n$$

wherein the decision variable $\mu_i$ is the correlation of a vector $\tilde{q}^i$, Q' is the number of symbols, $\tilde{s}$ denotes a vector of soft values $s'_n$, n=0,1, . . . , 2Q'-1, $q'^i_n$ is the nth element of the vector $\tilde{q}^i$, and where i is the index of the possible transmitted HARQ-ACK codeword.

15. The base station according to claim 14, wherein $\bar{q}^m$ is the most probable codeword obtained as the codeword with the maximum decision variable $\mu_m$ among all decision variables, and wherein the first mode detector (540) further is configured to perform one of the following:
  decide that the HARQ-ACK codeword $\bar{q}^m$ is detected in the received signal when the decision variable $\mu_m$ for $\bar{q}^m$ exceeds the decision threshold value $\tau$, and
  decide that the received signal is considered to comprise Discontinuous Transmission "DTX", when the decision variable $\mu_m$ for $\bar{q}^m$ is equal to or below the decision threshold value $\tau$.

16. The base station according to claim 13, wherein the selecting circuit, when the first mode is used, is further configured to select the decision threshold value $\tau$ such that it is proportional to the norm of $\tilde{s}$ so that the ratio $\mu_i/\tau$ is independent of the amplitude of the soft values.

17. The base station according to claim 16, wherein the norm of $\tilde{s}$ is an $l_p$-norm where p is a positive integer.

18. The base station according to claim 12, wherein the second mode detector is configured to for every possible transmitted HARQ-ACK codeword $\bar{q}^i$, correlate the codeword $\bar{q}^i$ with a vector of soft values $\bar{s}$ corresponding to the bits in the received signal where HARQ-ACK should be transmitted, to calculate a decision variable $\lambda_i$ for the second mode, according to $$\lambda_i = \bar{q}^i \cdot \bar{s} = \sum_{n=0}^{Q_{ACK}-1} q_n^i s_n$$

wherein $\bar{s}$ denotes a vector of the soft values $s_n$, n=0, 1 . . . $Q_{ACK}-1$, and $Q_{ACK}$ is the number of bits, and $q_n^i$ denotes the nth element of a vector $\bar{q}^i$, and where i is the index of the possible transmitted HARQ-ACK codeword.

19. The base station according to claim 18, wherein $\bar{q}^m$ is the most probable codeword with the maximum decision variable $\lambda_m$ among all decision variables, and wherein the second mode detector further is configured to perform one of the following:

decide that a HARQ-ACK codeword $\bar{q}^m$ is detected in the received signal when the decision variable $\lambda_m$ for $\bar{q}^m$ exceeds the decision threshold value $\tau$, and     decide that the received signal is considered to comprise DTX, when the decision variable $\lambda_m$ for $\bar{q}^m$ is equal to or below the decision threshold value $\tau$.

20. The base station according to claim 18, wherein the selecting circuit, when the second mode is used, is further configured to select the decision threshold value $\tau$ such that it is proportional to the norm of $\bar{s}$ so that the ratio $\lambda_t/\tau$ is independent of the amplitude of the soft values.

21. The base station according to claim 20, wherein the norm of $\bar{s}$ is an $l_p$-norm where p is a positive integer.

22. The base station according to claim 12, wherein the first mode detector is configured to correlate only the two first soft values for the modulation symbol in the received signal with the one or more known possible HARQ-ACK codewords, and the second mode detector is configured to correlate all calculated soft values for the modulation symbol in the received signal with the one or more known possible HARQ-ACK codewords.

\* \* \* \* \*